United States Patent
Burrell et al.

(10) Patent No.: US 10,274,574 B2
(45) Date of Patent: *Apr. 30, 2019

(54) SYSTEM AND METHOD OF TRANSMITTING LOCATION DATA BASED ON WIRELESS COMMUNICATION ACTIVITY

(71) Applicant: BlackBerry Limited, Waterloo (CA)

(72) Inventors: Douglas James Arthur Burrell, Waterloo (CA); Jerome Pasquero, Montreal (CA); David Ryan Walker, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 250 days.

This patent is subject to a terminal disclaimer.

(21) Appl. No.: 15/166,656

(22) Filed: May 27, 2016

(65) Prior Publication Data
US 2016/0274211 A1  Sep. 22, 2016

Related U.S. Application Data

(63) Continuation of application No. 13/454,734, filed on Apr. 24, 2012, now Pat. No. 9,354,292.

(51) Int. Cl.
*G01S 1/68* (2006.01)
*G01S 1/02* (2010.01)
(Continued)

(52) U.S. Cl.
CPC .................. *G01S 1/68* (2013.01); *G01S 1/02* (2013.01); *G01S 1/08* (2013.01); *G01S 13/825* (2013.01)

(58) Field of Classification Search
CPC ..... G01S 1/68; G01S 1/00; G01S 1/02; G01S 13/825; G01S 1/08; H04W 64/00
See application file for complete search history.

(56) References Cited

U.S. PATENT DOCUMENTS

| 9,332,498 B2* | 5/2016 | Nylander | H04W 52/0241 |
| 9,354,292 B2* | 5/2016 | Burrell | G01S 1/08 |

(Continued)

FOREIGN PATENT DOCUMENTS

| WO | 2009055874 | 5/2009 |
| WO | 2010035025 | 4/2010 |

OTHER PUBLICATIONS

Canadian Office Action dated Aug. 19, 2015, received for Canadian Application No. 2,811,855.

(Continued)

*Primary Examiner* — Cassi J Galt
(74) *Attorney, Agent, or Firm* — Thomas Grzesik; Fleit Gibbons Gutman Bongini & Bianco P.L.

(57) ABSTRACT

Systems and methods of transmitting location data based on wireless communication activity can include a location transmitting device having a sensor communicatively coupled to a low-power transmitter. The transmitter (e.g., a Bluetooth™ transmitter) can transmit location data from which an electronic device can derive its location. The sensor can be a sensor configured to detect wireless data transmissions (e.g., cellular data transmissions). In one example, the transmitter can transmit location data in response to the sensor detecting data transmissions of an electronic device. The transmitter can remain in an idle, standby, or otherwise low-power state until the sensor detects data transmissions of an electronic device. In response, the transmitter can transmit data which can be received by the electronic device. The electronic device can then derive the electronic device's location from the data transmitted by the transmitter.

19 Claims, 4 Drawing Sheets

(51) Int. Cl.
    *G01S 1/08*    (2006.01)
    *G01S 1/82*    (2006.01)
    *G01S 13/82*   (2006.01)

(56) References Cited

U.S. PATENT DOCUMENTS

2005/0105496 A1   5/2005   Ambrosino
2009/0085741 A1   4/2009   Ravi et al.
2009/0280825 A1   11/2009  Malik et al.

OTHER PUBLICATIONS

Nygaard-Jensen, T., "Sharing Music and Contextual Information in Mobile Social Network", Doctoral Dissertation, Technical University of Denmark, May 2010, pp. 1-139.

Espinoza, F., et al., "GeoNotes: Social and Navigational Aspects of Location-Based Information Systems", SICS Technical Report T2001/08, May 2001, pp. 1-17.

Summons to attend oral proceedings pursuant to Rule 115(1) EPC issued for European application No. 12165392.7 dated Oct. 24, 2018.

* cited by examiner

300

305
Detecting, from an electronic device and via a sensor, a cellular data transmission.

310
In response to detecting the cellular data transmission, transmitting, to the electronic device and via a transmitter, data from which a location position of the electronic device can be derived.

405
Transmitting, from an electronic device, a cellular data transmission.

↓

410
Receiving location data from a location transmitting device in response to the transmitted cellular data transmission.

↓

415
Determining the location position of the electronic device based at least in part on the location data transmitted by the location transmitting device.

FIG. 4

SYSTEM AND METHOD OF TRANSMITTING LOCATION DATA BASED ON WIRELESS COMMUNICATION ACTIVITY

FIELD OF TECHNOLOGY

The present disclosure relates generally to determining a location of an electronic device, and more specifically, to systems and methods of transmitting location data based on wireless communication activity.

BACKGROUND

Global Positioning System (GPS) provides positioning, speed, and time information services by using satellites. GPS is commonly used in mobile devices, such as smartphones, to determine the user's location. For example the antenna of the smartphone can receive GPS signals which include global positioning coordinates and current time data of respective GPS satellites. This data can then be processed by the mobile device to determine a specific or meaningful position of the user, such as an address. However, there are limitations to using GPS to determine the location of a smartphone. For example, difficulties arise in receiving GPS signal in a closed space or an indoor place. Typically, a clear path from the smartphone to the satellites of the GPS is needed for the smartphone to receive a GPS signal. As obstacles or obstructions, such as the walls of buildings, can attenuate or completely block GPS signals, the current position of a smartphone may become unavailable when the user enters a building or enclosed space. The present disclosure aims to overcome this disadvantage by providing a mechanism for obtaining positional information for a smartphone or the like when out of GPS coverage.

BRIEF DESCRIPTION OF THE DRAWINGS

In order to describe the manner in which the features of the disclosure can be obtained, a more particular description of the principles briefly described above will be rendered by reference to specific examples thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which:

FIG. 3 is flow chart of a method of transmitting location data based on wireless communication activity, in accordance with an example embodiment of the present disclosure and taken from the perspective of a location transmitting device; and FIG. 4 is flow chart of transmitting location data based on wireless communication activity, in accordance with an example embodiment of the present disclosure and taken from the perspective of the electronic device whose location is being determined.

DETAILED DESCRIPTION

Figure 1:
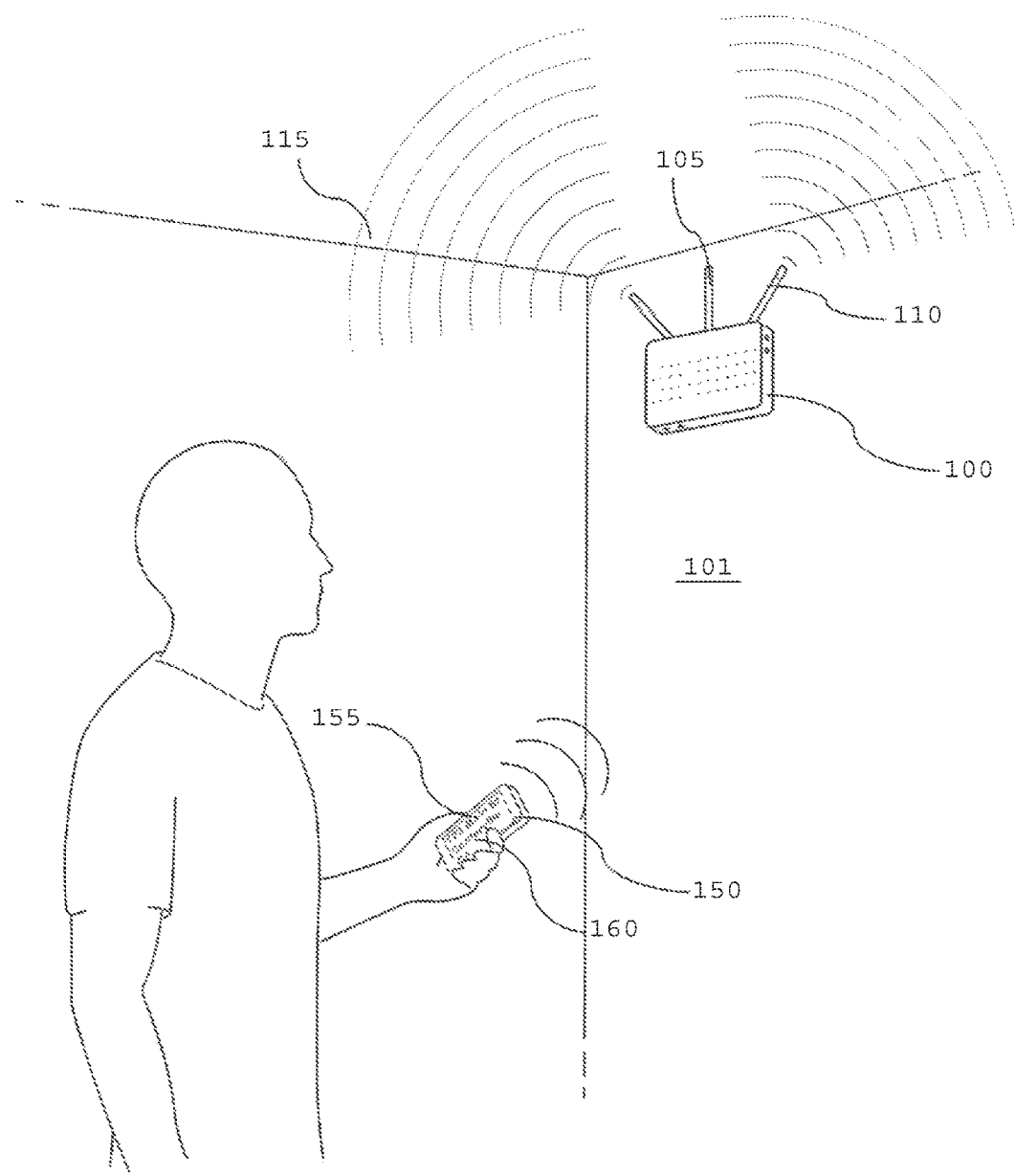
FIG. 1 is an illustration of transmitting location data based on wireless communication activity, in accordance with an example embodiment of the present disclosure.

Various examples of the disclosure are discussed in detail below. While specific implementations are discussed, it should be understood that this is done for illustration purposes only. A person skilled in the relevant art will recognize that other components and configurations may be used without parting from the scope of the disclosure.

Several definitions that apply throughout this document will now be presented. The phrase "coupled" is defined as connected, whether directly or indirectly through intervening components and is not necessarily limited to physical connections. Coupled devices are devices which are in signal communication with one another.

The term "electronic device" is defined as any device that is capable of at least accepting data, transmitting data, and executing commands. For example, electronic devices can include, but are not limited to, portable communication devices, mobile communication devices, mobile computers, smartphones, computing pads, tablet computers, personal computers, desktop computers, laptop computers, netbooks, servers, routers, set-top phones, or other electronic devices capable of at least accepting data, transmitting data, and executing commands.

According to one non-limiting example embodiment of the present disclosure, a system and method of transmitting location data based on wireless communication activity can include a location transmitting device having a sensor and a low-power transmitter communicatively coupled to the sensor. In response to the sensor detecting data transmissions of an electronic device, the low-power transmitter is configured to transmit data from which the electronic device can determine or derive the electronic device's location. In other words, the low-power transmitter can remain in an idle, standby, powered-down, or otherwise low-power state until the sensor detects data transmissions of an electronic device. In response to the detected data transmission of the electronic device, the low-power transmitter then transmits location data which can be received by the electronic device transmitting the data transmission(s). The electronic device can then determine or derive the electronic device's location from the location data transmitted by the low-power transmitter. The low-power transmitter can be a Bluetooth™ transmitter. The Bluetooth™ transmitter can be configured to transmit data packets that include a unique identification (ID) of the Bluetooth™ transmitter. The unique ID of the Bluetooth™ transmitter can be utilized to approximate an electronic device's (for example, a smartphone's) location with respect to the Bluetooth™ transmitter, and thereby an approximate location of the electronic device. The sensor can be a wireless sensor configured to detect wireless data transmissions (for example, cellular data transmissions, radio data transmissions, or any other wireless data transmission). In at least one embodiment, the sensor can be an antenna configured to detect data transmissions from electronic devices such as smartphones, mobile phones, electronic pads, or any other similar electronic device which can transmit data (for example, wireless communication data, voice data, text data, multimedia data, etc.).

In conventional non-GPS systems for determining locations, the sensors of the conventional non-GPS system are constantly powered to transmit data packets that include data from which other devices can determine their respective locations. However, the present technology of transmitting location data based on wireless communication activity maximizes power efficiency by transmitting data in response to detected data transmissions of an electronic device. If no data transmissions associated with an electronic device are detected, then the low-power transmitter (for example, the Bluetooth™ transmitter) will not transmit data. Instead, the low-power transmitter will wait until the sensor detects data transmissions associated with an electronic device before the low-power transmitter transmits data from which electronic devices can determine or derive their locations.

Further details regarding the systems and methods of transmitting location data based on wireless communication activity will be described below in relation to FIGS. 1-4.

FIG. 1 is an illustration of transmitting location data based on wireless communication activity, in accordance with an example embodiment of the present disclosure. In FIG. 1, a location transmitting device 100 can be affixed to a wall 101 of a room. For example, the location transmitting device 100 can be mounted to the wall 101, adhered to the wall 101, or placed anywhere in the room where the location transmitting device 100 can receive or detect wireless communication activity (for example, data transmissions associated with an electronic device 150) and where the location transmitting device 100 can also transmit, to an electronic device 150, data from which the electronic device 150 can determine the electronic device's location 150. In FIG. 1, the location transmitting device 100 includes a sensor 105 that is configured to detect one or more of Global System for Mobile Communications (GSM) transmissions, General Packet Radio Service (GPRS) transmissions, Code Division Multiple Access (CDMA) transmissions, 4G transmissions, 3G transmissions, Long term evolution (LTE) transmissions, and Enhanced Data Rates for GSM Evolution (EDGE) transmissions associated with electronic devices 150 such as cellphones, smartphones, personal digital assistants (PDAs), electronic pads, electronic tablets, or any other electronic device operating on one or more of the GSM, GPRS, CMDA, LTE, and EDGE cellular networks. In at least one implementation, the sensor 105 can be an antenna configured to detect cellular transmissions, as illustrated in FIG. 1. The sensor 105 can detect one or more voice data transmissions (for example, voice calls, etc.), text data transmissions (for example, emailing, texting, etc.), multimedia transmissions (for example streamlining music, streamlining video, web browsing, internet activity, etc.), or any other wireless communication activity.

In FIG. 1, the location transmitting device 100 also includes a low-power transmitter 110. For example, the low-power transmitter can be a Bluetooth™ transmitter, a radio frequency identification (RFID) transmitter, a Wi-Fi transmitter (for example, a Wi-Fi access point or Wi-Fi hotspot), a wireless local area network (WLAN) node, or any other transmitter that does not require a large amount of power to transmit data, such as location data from which other devices can determine or derive their respective locations (for example, transmitters having low power wireless data protocols such as ZigBee, RF4CE, ANT, 6LoWPAN, and other low power wireless data protocols). In FIG. 1, the low-power transmitter 110 is a Bluetooth™ transmitter. The Bluetooth™ transmitter 110 can transmit data packets that include location data 115 of the Bluetooth™ transmitter 110. For example, the location data 115 can include a unique ID of the Bluetooth™ transmitter 110. The unique ID can include location information associated with the Bluetooth™ transmitter 110. For example, the unique ID can include the coordinates, the address, or any other location data of the Bluetooth™ transmitter 110. Based on the unique ID, another electronic device 150 can determine its (the electronic device's 150) proximity to the Bluetooth™ transmitter 110. In other embodiments, the electronic device 150 can determine that the address, coordinates, or location data of the Bluetooth™ transmitter 110 is the location of the electronic device 150. In still other embodiments, the location transmitting device 100 (for example, via the transmitter 110) can send, to the electronic device 150, a measure of the received signal strength (RSSI) of the signal associated with the cellular data transmission by the electronic device 150. In other embodiments, the location transmitting device 100 (for example, via the transmitter 110) can send a measure of the RSSI of the signal associated with the location data transmitted by the transmitter 110 to the electronic device 150. In either embodiment, the signal strength measurement can then allow the electronic device 150 to triangulate the electronic device's 150 exact location as long as it is in contact with at least three location transmitting devices 100 or three transmitters 110 and is able to obtain the RSSI from each of the transmitting devices 100 or transmitters 110.

In FIG. 1, the location transmitting device 100 can be configured such that the Bluetooth™ transmitter 110 does not transmit location data 115 until the sensor 105 detects data transmissions (for example, cellular data transmissions or cellular activity). By utilizing the sensor 105 to determine when the Bluetooth™ transmitter 110 transmits location data 115, a Bluetooth™ receiver is not required or necessary. However, in some embodiments, the Bluetooth™ transmitter 110 can be a transceiver or can include a receiver. Also, by utilizing the sensor 105 to determine when the Bluetooth™ transmitter 110 transmits location data 115, it is unnecessary for the Bluetooth™ transmitter 110 to constantly or even periodically transmit location data or listen for other electronic devices 150 that can have Bluetooth™ transceivers. Instead, the Bluetooth™ transmitter 110 can simply be a transmitter that remains in a low-power state or first power state (for example, a state in which the Bluetooth™ transmitter 110 does not transmit any location data) until the sensor 105 detects or senses data transmissions. By remaining in the low-power state, the Bluetooth™ transmitter 110 can preserve the battery life or power supply of the Bluetooth™ transmitter (for example, if the Bluetooth™ transmitter 110 has its own power supply) or the power supply of the location transmitting device 100 (for example, if the Bluetooth™ transmitter 110 shares a power supply with the sensor 105).

In FIG. 1, a user holding an electronic device 150 can enter the room. In FIG. 1, the electronic device 150 is a smartphone or cellphone, but those of ordinary skill in the art will appreciate that the electronic device 150 can be any other device that is configured to transmit wireless data or data that can be detected by the sensor 105. In FIG. 1, the user is texting or sending text messages via his smartphone 150 (that is his electronic device 150). However, those of ordinary skill in the art will appreciate that the smartphone 150 can transmit other data transmissions such as conducting voice data transmissions (for example, making a voice call) or multimedia data transmissions (for example, sending photos, sending videos, streaming videos, conducting a video chat, etc.). In FIG. 1, the text messages can be transmitted over a cellular network, such as a GSM network. The GSM transmission or signal corresponding to the text message(s) sent by the user can be sensed or detected by the sensor 105. When the sensor 105 detects the GSM transmission of the electronic device 150, the sensor 105 can transmit a signal to the Bluetooth™ transmitter 110 to enter a powered-on, higher-powered, a transmission-enabled-state, or second power state. In this second power state, the Bluetooth™ transmitter 110 can transmit data (for example, location data) from which the electronic device 150 can determine or derive its location.

In FIG. 1, the Bluetooth™ transmitter 110 has transmitted a data packet including the unique ID of the Bluetooth™ transmitter 110. The processor (not shown) of the electronic device 150 can then determine the electronic device's 150 location based at least in part on the unique ID of the Bluetooth™ transmitter 110. For example, the processor of the electronic device 100 can approximate the electronic device's 110 location as being collocated with the location of the Bluetooth™ transmitter 110. For example, in FIG. 1, the unique ID of the Bluetooth™ transmitter 110 can correspond to the address 123 Main St., Centerville, Calif. When the electronic device 150 receives the location data (for example, the unique ID of the Bluetooth™ transmitter), the processor of the electronic device 150 can determine that the location 155 of the electronic device 150 is also the address 123 Main St., Centerville, Calif. In other implementations, for example, where the location transmitting device 100 can be a system of location transmitting devices 100 having more than one transmitter 110 configured to transmit location data, the electronic device 150 can determine the electronic device's 150 location by triangulating the electronic device's location 155 from each of the transmitters 110 that transmitted location data. The electronic device's location 155 can also be determined by a Received Signal Strength Indicator (RSSI) method or any other method for determining the user's location from data transmitted by a low-power transmitter.

In FIG. 1, the electronic device's location 155 can be displayed on a display screen 160 of the electronic device 100. In other embodiments, the electronic device's location 155 can be utilized to transmit a message to the user's social network that the user is at 123 Main St., Centerville, Calif. In other implementations, when the location 155 of the electronic device 150 is determined, the location 155 can be utilized to "check-in" at the location 155 (for example, by a phone application or a web-based application), can be utilized to associate the location 155 with photos or other media captured at the location 155, can be utilized to change settings of the electronic device 150 based on the location 155, can be utilized in any other location-specific or location-based application, or can be utilized in any other application in which the location of the electronic device 150 can be utilized.

Figure 2:
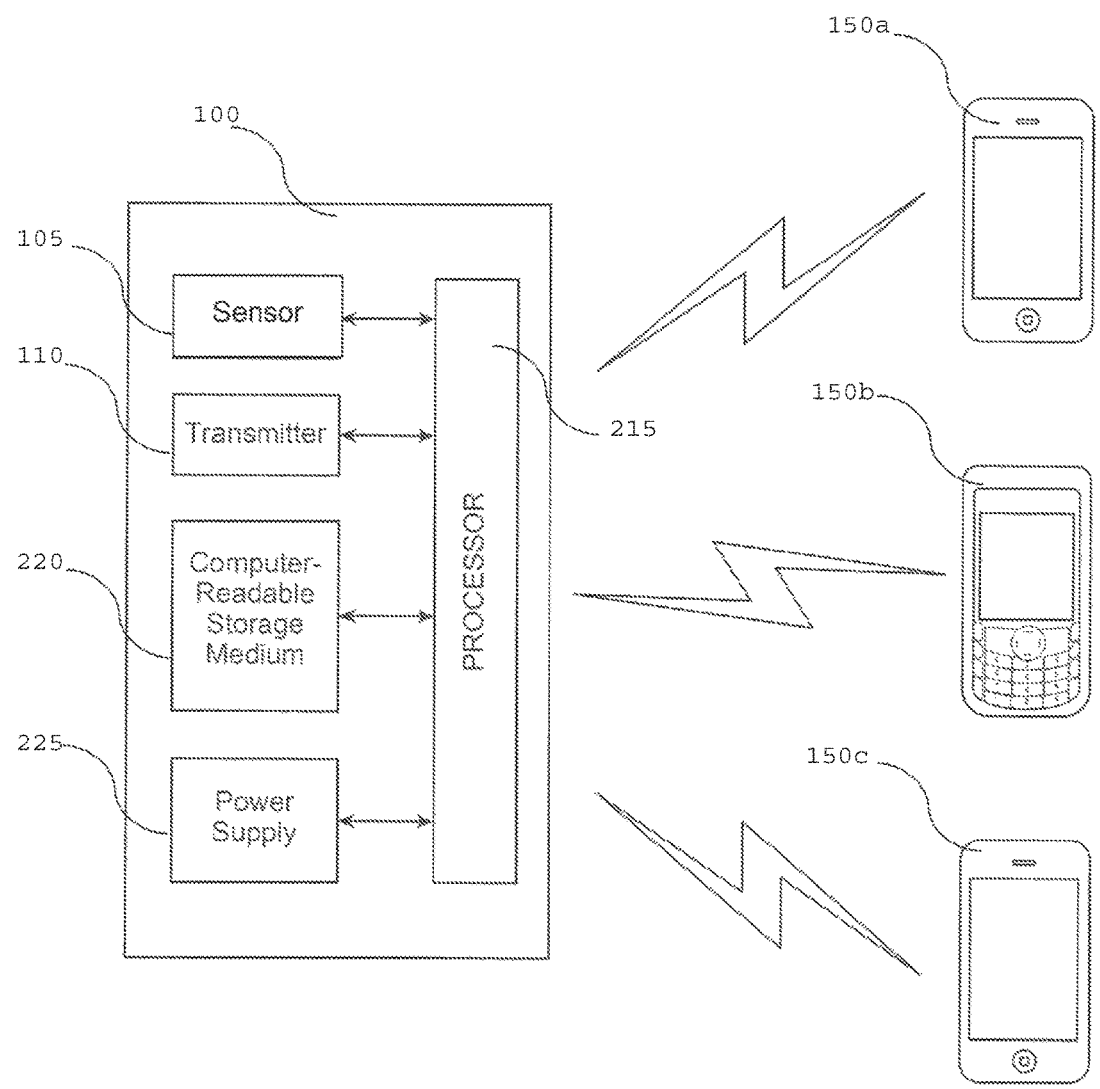
FIG. 2 is a block diagram of an example system for transmitting location data based on wireless communication activity, where the system comprises a location transmitting device, in accordance with an example embodiment of the present disclosure.

FIG. 2 is a block diagram of a system of transmitting location data based on wireless communication activity. In FIG. 2, the system 200 can include the location transmitting device 100 and one or more electronic devices 150*ac*.

In FIG. 2, the location transmitting device 100 can include a sensor 105, a transmitter 110, a computer-readable storage medium 220, a power supply 225, and a processor 215. While FIG. 2 illustrates one each of a sensor 105, a transmitter 110, a computer-readable storage medium 220, a power supply 225, and a processor 215, those of ordinary skill in the art will appreciate that more than one sensor 150, transmitter 110, computer-readable storage medium 220, power supply 225, and processor 215 can be implemented.

In FIG. 2, the sensor 105 can be a wireless activity sensor, a cellphone detector or sensor, a cellular activity detector or sensor, a cellular data transmission detector or sensor, or any other sensor which can be configured to sense, detect, monitor, or listen for wireless activity or data transmissions associated with electronic devices 150. In at least one implementation, the sensor 105 can be configured to sense, detect, monitor, or listen for GSM transmissions, GPRS transmissions, CDMA transmissions, EDGE transmissions, 4G transmissions, 3G transmissions, 2G transmissions, LTE transmissions, Integrated Digital Enhanced Network (iDEN) transmission, Digital Enhanced Cordless Telecommunications (DECT) transmissions, Integrated Digital Enhanced Network (iDEN) transmissions, Wi-Fi transmissions, Bluetooth™ transmissions, near-field-communication (NFC) transmissions, peer-to-peer (P2P) transmissions, any combination thereof, or any other wireless activity or data transmission associated with electronic devices 150*a-c*. The sensor 150 can have its own power supply 225 or can share its power supply with other components of the location transmitting device 100. The sensor 105 can be a passive device that simply listens for data transmissions or wireless activity associated with electronic devices 150. That is, the sensor 105 does not transmit data or signals until a triggering event occurs. For example, the triggering event can be the detection of wireless activity or data transmissions (such as cellular data transmissions) associated with electronic device 150*a-c*. As discussed above, when the sensor 105 detects or senses wireless activity or data transmissions (such as cellular data transmissions) associated with electronic devices 150*a-c*, the sensor 105 can transmit a signal to the transmitter 110 of the location transmitting device 100. The signal can indicate the transmitter 110 should switch from a first power state (for example, a standby, idle, powered-down, data-transmissions-disabled, or low power state) to a second power state (for example, a powered-on, an active, a data-transmissions-enabled, or high power state), such that the transmitter 110 can transmit data from which the electronic device(s) 150*a-c* can determine or derive its location 155. In other embodiments, the signal can instruct the transmitter 110 should switch from a first power state (for example, a standby, idle, powered-down, data-transmissions-disabled, or low power state) to a second power state (for example, a powered-on, an active, a data-transmissions-enabled, or high power state), such that the transmitter 110 can transmit data from which the electronic device(s) 150*a-c* can determine or derive its location 155

The location transmitting device 100 of FIG. 2 can include one or more transmitters 110 as discussed above. The transmitter 110 can be a device which is configured to transmit data from which an electronic device 150 can determine or derive its location 155. For example, the transmitter 110 can be a Bluetooth™ transmitter, a radio frequency identification (RFID) transmitter, a Wi-Fi transmitter (for example, a Wi-Fi access point or Wi-Fi hotspot), a wireless local area network (WLAN) node, or any other transmitter that does not require a large amount of power to transmit data, such as location data from which other devices can determine or derive their respective locations (for example, transmitters having low power wireless data protocols such as ZigBee, RF4CE, ANT, 6LoWPAN, and other low power wireless data protocols). In FIG. 2, the transmitter 110 and the sensor 105 are separate devices, but in other implementations, the transmitter 110 and sensor 105 can be integrated as one device.

The transmitter 110 can have its own power supply separate from the power supply of the sensor 105 or can share a power supply 225 with the sensor 105. The transmitter 110 can be configured to remain in a first power state (for example, a standby, idle, power-down, data-transmissions-disabled, or low power state) to a second power state (for example, a powered-on, an active, a data-transmissions-enabled, or high power state) until the sensor 105 transmits a signal thereto that wireless activity or data transmissions associated with electronic devices 150 have been sensed or detected. That is, in response to the sensor 105 sensing wireless activity or data transmissions associated with electronic devices 150 have been sensed or detected, the transmitter 110 can be switched from the first power state to the second power state, thereby allowing the transmitter 110 to transmit data from which electronic devices 150a-c can determine or derive their locations.

In another implementation, the transmitter 110 can maintain the first power-state until wireless activity or data transmissions associated with electronic devices 150 have been sensed or detected by the sensor 105.

In yet another implementation, the transmitter 110 can transmit data only in response to the sensor 105 detecting wireless activity or data transmissions associated with electronic devices 150 have been sensed or detected.

In still another implementation, in response to detecting wireless activity or data transmissions associated with electronic devices 150, the transmitter 110 can be powered on to allow the transmitter 110 to transmit data from which the electronic devices 150a-c can determine or derive their locations.

Also illustrated in FIG. 2, the location transmitting device 100 can include a processor 215 directly or indirectly coupled to at least one of the sensor 105 and the transmitter 110. The processor 215 can be a processor assembly including one or more processors. The processor 215 can be a solid state processor, a core processor, or any other processor 215 configured to execute instructions for transmitting location data based on wireless communication activity.

FIG. 2 also illustrates that the location transmitting device 100 can include a transitory or non-transitory computer readable medium 220. The computer readable storage medium 225 can store instructions for transmitting location data based on wireless communication activity.

For example, the processor 215 can execute instructions stored in the computer-readable medium 220 that controls when the transmitter 110 transmits location data from which electronic devices 150a-c can determine or derive their location. In at least one implementation, the sensor 105 and the transmitter 110 can be communicatively coupled to the processor 215. When the sensor 105 detects or senses data transmissions or wireless communication activity (such as cellular data transmissions), the sensor 105 can transmit a signal to the processor 215 indicating data transmissions or wireless communication activity (such as cellular data transmissions) have been sensed. The processor 215 can then transmit instructions to control the transmitter 110 or instruct the transmitter 110 to switch to a power state in which location data can be transmitted. That is, the processor 215 can receive the detections of the sensor 105 and can instruct the transmitter 110 to power-on, wake from a standby state or an idle state, or otherwise switch to a power-state in which location data can be transmitted.

FIG. 2 also illustrates that the location transmitting device 100 can sense or detect data transmissions from or associated with one or more electronic devices 150a-c. The transmitter 110 can transmit location data in response to each of these detected data transmissions. Those of ordinary skill in the art will appreciate that the electronic devices 150a-c can be of the same type or different types of electronic devices. For example, electronic devices 150a-c can be portable communication devices, mobile communication devices, mobile computers, smartphones, computing pads, tablet computers, personal computers, desktop computers, laptop computers, netbooks, set-top phones, portable digital assistants (PDA), DVD players, portable Blu-ray® players, peer-to-peer cable televisions (for example, a network television), audio-playback devices, portable music players, or other electronic device capable of at least accepting data, transmitting data, and executing commands.

The disclosure now turns to non-limiting examples of methods of transmitting location data based on wireless communication activity. FIGS. 3 and 4 are flow charts of methods of transmitting location data based on wireless communication activity. The methods 300, 400 illustrated in FIGS. 3 and 4 are provided by way of example, as there are a variety of ways to carry out the method. Additionally, while the example methods 300, 400 are illustrated with a particular order of steps, those of ordinary skill in the art will appreciate that FIGS. 3 and 4 and the steps illustrated therein can be executed in any order that accomplishes the technical advantages of the present disclosure and can include fewer or more steps than illustrated.

Each block shown in FIGS. 3 and 4 can represent one or more processes, methods or subroutines, carried out in example method 300, 400. The steps illustrated in FIGS. 3 and 4 can be implemented in a system including a location transmitting device 100 an electronic device 150 such as a smartphone, an electronic tablet, or any other electronic device capable of at least accepting data, transmitting data, and executing commands. Each block shown in FIGS. 3 and 4 can be carried out by the processor 215 of the location transmitting device 100 (which can be one or more processors or one or more processing systems communicatively coupled to the location transmitting device 100) illustrated in FIG. 2. The flow chart illustrated in FIG. 3 will be described in relation to and make reference to the location transmitting device 100 illustrated in FIG. 2. The flow chart illustrated in FIG. 4 will be described in relation to the electronic device 150 whose location can be determined or derived from data transmitted by the location transmitting device 100.

In FIG. 3, the method 300 can begin at block 305. At block 305, wireless communication activity (for example, cellular data transmissions associated with electronic devices 150) can be detected. For example, a sensor 105 such as the ones described above, can detect the wireless communication activity. The sensor 105 can be configured to sense, detect, monitor, or listen for GSM transmissions, GPRS transmissions, CDMA transmissions, EDGE transmissions, 4G transmissions, 3G transmissions, 2G transmissions, LTE transmissions, Integrated Digital Enhanced Network (iDEN) transmission, Digital Enhanced Cordless Telecommunications (DECT) transmissions, Integrated Digital Enhanced Network (iDEN) transmissions, Wi-Fi transmissions, Bluetooth™ transmissions, near-field-communication (NFC) transmissions, peer-to-peer (P2P) transmissions, any combination thereof, or any other wireless activity or data transmission associated with electronic devices 150. As discussed above, the wireless communication activity can include one or more voice data transmissions (for example, voice calls, etc.), text data transmissions (for example, emailing, texting, etc.), multimedia transmissions (for example streamlining music, streamlining video, web browsing, internet activity, etc.), or any other wireless communication activity. In response to detecting the wireless communication activity, the method can proceed to block 310.

At block 310, in response to detecting the wireless communication activity, data from which the electronic device 150 can determine or derive the location position of the electronic device 150 can be transmitted to the electronic device 150. The data can be transmitted via the transmitter 110 of the location transmitting device 100. For example, as discussed above, the transmitter 110 can be a Bluetooth™ transmitter, a radio frequency identification (RFID) transmitter, a Wi-Fi transmitter (for example, a Wi-Fi access point or Wi-Fi hotspot), a wireless local area network (WLAN) node, or any other transmitter that does not require a large amount of power to transmit data from which other devices can determine or derive their respective locations. The data can be identification data associated with the transmitter 110, an address of the transmitter 110, an internet protocol (IP) address of the transmitter 110, a MAC address of the transmitter 110, a Bluetooth™ unique ID, an RFID tag, or any other data form which the electronic device 150 can determine its location position.

Those of ordinary skill in the art will appreciate that the transmitter 110 can transmit the data only in response to a detection of wireless communication activity or cellular data transmissions by the sensor 105; can maintain a low-power state (for example, an idle state, a standby state, a data transmission-disabled state, a sleep state, a powered off state, etc.) until wireless communication activity or cellular data transmissions are detected; can switch from a first power state (low power state) to a second state (a high power, powered on state, a data transmission-enabled state, etc.) in response to a detection of wireless communication activity or cellular data transmissions by the sensor 105, where the transmitter 110 can transmit data in the second state; can power on in response to a detection of wireless communication activity or cellular data transmissions by the sensor 105; or any other similar state in which data transmitted by the transmitter 110 is based upon the detection of wireless communication activity or cellular data transmissions by the sensor 105.

Although not illustrated, the method 300 can include returning to a low-power state after transmitting data. For example, after the transmitter 110 transmits data in response to the sensor's 105 detection of wireless communication activity or cellular data transmissions, the transmitter 110 can return to a low-power state (for example, an idle state, a standby state, a data transmission-disabled state, a sleep state, a powered off state, a powered down state, etc.). In such a state, the transmitter 110 will not transmit data until another wireless communication activity or cellular data transmission is detected.

FIG. 4 illustrates the method of transmitting location data based on wireless communication activity taken from the perspective of the electronic device 150 whose location can be determined by location data transmitted by the location transmitting device 100. In FIG. 4, the method can begin at block 405.

At block 405, the electronic device 150 can transmit a data transmission. For example, the electronic device 150 can engage in wireless communication activity or cellular data transmission such as one or more voice data transmissions (for example, voice calls, etc.), text data transmissions (for example, emailing, texting, etc.), multimedia transmissions (for example streamlining music, streamlining video, web browsing, internet activity, etc.), or any other wireless communication activity. For example, the electronic device 150 can be located indoors, where GPS is unavailable but cellular communication is available. A voice call can be initiated or carried out on the electronic device 150. The voice call can be a cellular data transmission or wireless communication activity detectable by the sensor 105 of a location transmitting device 100. After transmitting the data transmission or wireless communication activity, the method can proceed to block 410.

At block 410, the electronic device 150 can receive data from the location transmitting device 100. For example, from the transmitter 110 of the location transmitting device 100. The data can be that from which the electronic device 150 can determine or derive its location position. The data can be identification data associated with the transmitter 110, an address of the transmitter 110, an internet protocol (IP) address of the transmitter 110, a MAC address of the transmitter 110, a Bluetooth™ unique ID, an RFID tag, or any other data form which the electronic device 150 can determine its location position. After receiving the data, the method can proceed to block 415.

At block 415, the location position of the electronic device 150 can be determined. For example, a processor communicatively coupled to the electronic device 150 can determine or derive the location position of the electronic device 150 from the data (for example, location data) of the transmitter 110. In one implementation, the location data of the transmitter 110 can be determined as being collocated with the electronic device 100. That is, the location of the transmitter 110 can be the location of the electronic device 150. In other implementations, the transmitter 110 can transmit data such as a unique ID, a Wi-Fi hotspot location, an address, a MAC address, stored GPS coordinates of the transmitter 110, or any other location coordinates or location data of the transmitter 110. The location of the electronic device 150 can then be determined to be the same as or proximate to the location or associated location of the transmitter 110. In other implementations, the location of the electronic device 150 can be approximated, triangulated, or otherwise derived from data transmitted by one or more transmitters 110 of the location transmitting device 100.

With the present systems and methods of transmitting location data based on wireless communication activity, a power efficient, low cost, and low energy device is provided to allow for the determination of a location of an electronic device 150 while the electronic device 150 is located indoors or in a location where GPS is unavailable. Also, with the presently disclosed systems and methods of transmitting location data based on wireless communication activity, processing power and battery life is preserved, as the sensor 105 passively listens for, senses, or detects wireless communication activity, while the transmitter 110 remains in a low-power state. As the sensor 105 is the device that listens for, senses, or detects wireless communication activity, the transmitter 110 does not necessarily require a receiver to receive data (for example, Bluetooth™ transmissions). Also, the transmitter 110 does not necessarily require that its location data be constantly or periodically transmitted to other devices listening for such data or location data transmissions. Instead, the transmitter 110 need only transmit location data, location data packets, or location data transmissions when an electronic device 150 is sensed by the sensor 105 (for example, by sensing the wireless communication activity or cellular data transmissions of the electronic device 150.

Examples within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be utilized to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other examples of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Examples may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various examples described above are provided by way of illustration only and should not be construed to limit the scope of the disclosure. For example, the principles herein apply not only to a smartphone device but to other devices capable of detecting communications such as a laptop computer. Those skilled in the art will readily recognize various modifications and changes that may be made to the principles described herein without following the example embodiments and applications illustrated and described herein, and without departing from the scope of the disclosure.

We claim:

1. A location transmitting device comprising:
    a processor;
    a low-power transmitter having an idle first power state and a second power state; and
    a sensor communicatively coupled to the low-power transmitter, wherein the sensor is a device separate from and not part of the low-power transmitter,
    the sensor configured to detect a cellular data transmission associated with at least one electronic device, wherein the low-power transmitter is configured to transmit one or more wireless signals conforming to a different wireless communication protocol than the cellular data transmission,
    the sensor further configured to transmit a signal to the processor in response to detecting the cellular data transmission, and
    the processor configured to execute instructions in response to receiving the signal from the sensor, wherein in response to executing the instructions the processor
        switches the low-power transmitter from the idle first power state to the second power state.

2. The location transmitting device of claim 1, wherein the low-power transmitter is configured to remain in the idle first power state until the sensor has detected the cellular data transmission.

3. The location transmitting device of claim 1, wherein the idle first power state is a low-power state and the second power state is a full power state.

4. The location transmitting device of claim 1, wherein the low-power transmitter is configured to transmit a wireless signal to the electronic device after the low-power transmitter has been switched from the idle first power state to the second power state.

5. The location transmitting device of claim 1, wherein the low-power transmitter is one of a Bluetooth transmitter, a Radio-frequency identification (RFID) transmitter, and a wireless communication network transmitter.

6. The location transmitting device of claim 1, wherein the sensor is configured to detect cellular data transmissions comprising at least one of: a Global System for Mobile Communications (GSM) transmission, a General Packet Radio Service (GPRS) transmission, a Code Division Multiple Access (CDMA) transmission, an Enhanced Data Rates for GSM Evolution (EDGE) transmission, a Digital Enhanced Cordless Telecommunications (DECT) transmission, and an Integrated Digital Enhanced Network (iDEN) transmission.

7. A method by a location transmitting device, the method comprising:
    detecting, via a sensor of the location transmitting device, a cellular data transmission from an electronic device;
    in response to detecting the cellular data transmission, transmitting a signal to a processor of the location transmitting device; and
    upon receipt of the signal at the processor, switching a transmitter coupled to the sensor from an idle first power state to a second power state, wherein the sensor is a device separate from and not part of the transmitter, wherein the transmitter is configured to transmit one or more wireless signals conforming to a different wireless communication protocol than the cellular data transmission.

8. The method of claim 7, further comprising transmitting, to the electronic device and via the transmitter in the second power state, a wireless signal to the electronic device.

9. The method of claim 8, wherein the wireless signal is only transmitted to the electronic device in response to detecting the cellular data transmission.

10. The method of claim 8, further comprising disabling transmissions from the transmitter after transmitting the wireless signal to the electronic device.

11. The method of claim 8, wherein transmitting the wireless signal to the electronic device comprises transmitting the data by one of a Bluetooth transmitter, a Radio-frequency identification (RFID) transmitter, and a wireless communication network transmitter.

12. The method of claim 7, wherein the cellular data transmission is at least one of: a Global System for Mobile Communications (GSM) transmission, a General Packet Radio Service (GPRS) transmission, a Code Division Multiple Access (CDMA) transmission, an Enhanced Data Rates for GSM Evolution (EDGE) transmission, a Digital Enhanced Cordless Telecommunications (DECT) transmission, and an Integrated Digital Enhanced Network (iDEN) transmission.

13. The method of claim 7, further comprising maintaining the idle first power state until the cellular data transmission is detected.

14. The method of claim 7, further comprising, in response to detecting the cellular data transmission, powering on the transmitter.

15. A non-transitory computer-readable storage medium storing instructions which, when executed by a location transmitting device, cause the location transmitting device to:
  detect, via a sensor of the location transmitting device, a cellular data transmission from an electronic device;
  in response to the cellular data transmission having been detected, transmit a signal to a processor of the location transmitting device; and
  upon receipt of the signal at the processor, switch a transmitter coupled to the sensor from an idle first power state to a second power state, wherein the sensor is a device separate from and not part of the transmitter, wherein the transmitter is configured to transmit one or more wireless signals conforming to a different wireless communication protocol than the cellular data transmission.

16. The non-transitory computer-readable storage medium of claim 15, further comprising instructions which cause the location transmitting device to transmit, to the electronic device and via the transmitter in the second power state, a wireless signal to the electronic device.

17. The non-transitory computer-readable storage medium of claim 16, wherein the wireless signal is only transmitted to the electronic device in response to detecting the cellular data transmission.

18. The non-transitory computer-readable storage medium of claim 16, further comprising instructions which cause the location transmitting device to disable transmissions from the transmitter after the wireless signal has been transmitted to the electronic device.

19. The non-transitory computer-readable storage medium of claim 15, further comprising instructions which cause the location transmitting device to maintain the idle first power state until the cellular data transmission is detected.

* * * * *